Jan. 29, 1924.  1,481,896

H. N. GARSON ET AL

SPRING SUSPENSION FOR MOTOR VEHICLES

Filed April 26, 1922  2 Sheets-Sheet 1

Henrik N. Garson
Thorvald N. Garson
INVENTORS.

BY
W. Lee Helms
ATTORNEY.

Jan. 29, 1924.
H. N. GARSON ET AL
1,481,896
SPRING SUSPENSION FOR MOTOR VEHICLES
Filed April 26, 1922 — 2 Sheets-Sheet 2
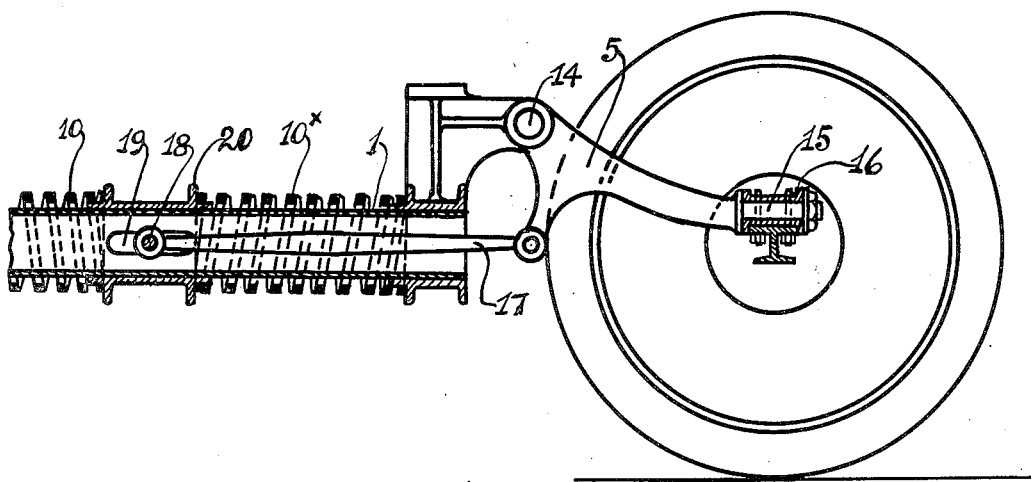
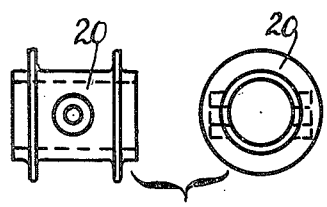
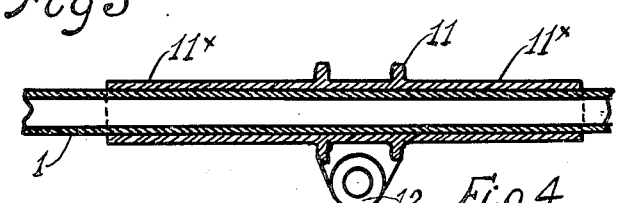
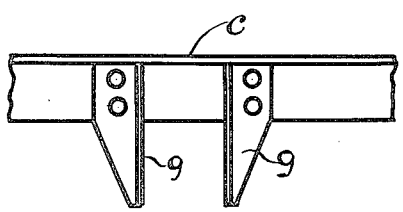

Patented Jan. 29, 1924.

1,481,896

UNITED STATES PATENT OFFICE.

HENRIK N. GARSON AND THORVALD N. GARSON, OF NEW YORK, N. Y.

SPRING SUSPENSION FOR MOTOR VEHICLES.

Application filed April 26, 1922. Serial No. 556,794.

*To all whom it may concern:*

Be it known that HENRIK N. GARSON, a subject of Norway, and THORVALD N. GARSON, a citizen of the United States, both residing in the city of New York, county and State of New York, and whose post-office address is 30 Church Street, New York city, have invented certain new and useful Improvements in Spring Suspensions for Motor Vehicles, of which the following is a specification.

Our improvements relate more particularly to the type of suspension which is the subject of our Letters Patent No. 1,412,733 of April 11, 1922, and particularly to the rocker-connections between the frame, the springs and the axle, to means for preventing side-sway, and other features hereinafter more particularly referred to.
The invention will be understood by reference to the accompanying drawings, in which—

Fig. 3 is a fragmentary, partly sectional elevation of a modification in the connections between the rockers and the springs.

Fig. 4 is a longitudinal sectional view of the slide contact member for a load-carrying spring and its complementary bumper spring, mounted in position upon a tubular side-frame member.

Fig. 5 comprises detail views of the slide-contact member shown in Fig. 3.

Fig. 6 illustrates in plan and elevation a section of the front axle carrying the abutment roller.

Fig. 7 is a fragmentary plan view of the front transverse frame member provided with the opposed vertical guide walls for the abutment roller of the front axle.

Figure 1:
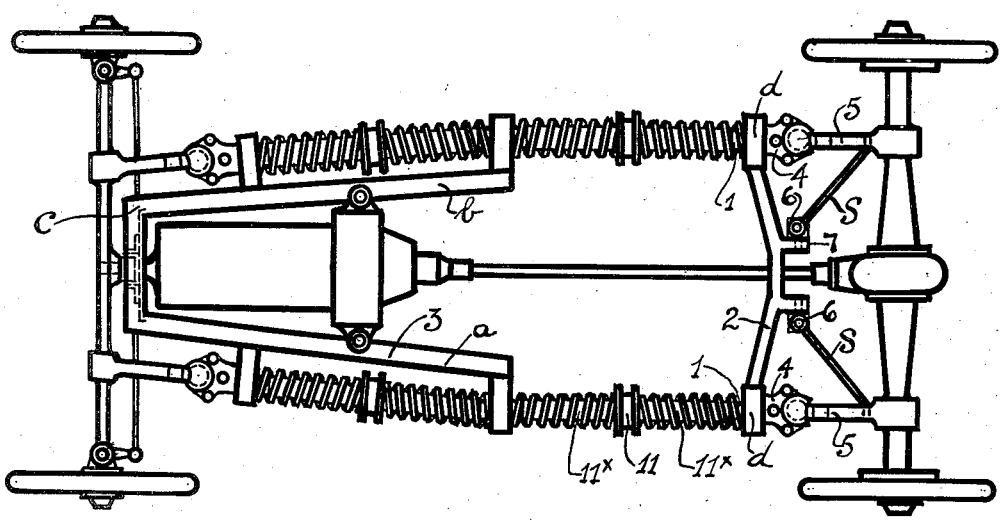
Fig. 1 is a plan view of an automobile chassis embodying the invention, and
25

In the embodiment shown in Figs. 1, 2, 4, 6 and 7 of the drawings the chassis comprises the tubular longitudinal frame members 1 connected at their rear ends by the rear cross-frame member 2 and at their front ends by the front transverse frame member 3, the latter being formed as a forwardly projecting U-shaped member having at each longitudinal side two depending sleeves $3^x$, $3^{xx}$ which receive the appropriate longitudinal tube 1. The upper horizontal faces $a$, $b$, $c$, afford adequate support for a radiator and the front section of a body, (not shown); and the U-shaped member 3 as a whole affords a three point suspension for the engine, as shown in Fig. 1. The upwardly extending arms $d$ of the rear cross frame member 2 serve as supports for the rear of the body.

Each end of each tubular side frame member 1 projects slightly beyond its connecting cross frame member and has bolted thereon the upper and lower halves of a socket member 4 which embraces a ball carried at one end of a rocker 5 which at its opposite end is rigidly connected to the appropriate axle. At the rear of the chassis the axle is maintained in alinement, and side-sway resisted, by means of the sway rods $s$ intermediate the axle and collars 6 free for oscillations in stud bolts secured to projections 7 of the rear cross frame member 2.

Figure 2:
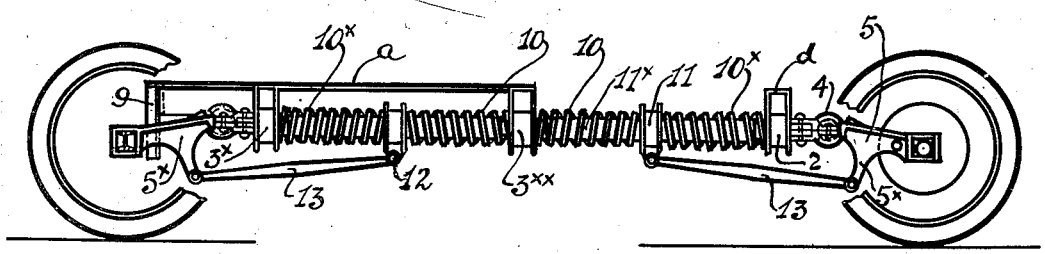
Fig. 2 is an elevation of the same.

The front axle carries a centrally disposed roller $7^x$ which rotates upon a stud-screw 8 and in the relative vertical movement of the chassis-frame and the axle this roller is guided between the opposed vertically disposed guide-plates 9 carried by the front cross-frame member (Figs. 1 and 2). In this manner the front axle and frame are maintained in proper alinement.

Each longitudinal tubular member carries two helical springs at each side of the depending sleeve $3^{xx}$ of the front cross frame member. Each innermost spring 10 is a bumper spring while the outer springs $10^x$ are load-carrying springs, each set comprising one bumper and one load-carrying spring engaged by an abutment-collar 11 on a sleeve $11^x$ (Fig. 4) mounted on an appropriate longitudinal tubular member 1. This collar 11 is formed with a depending apertured lug 12 to which is pivotally connected one end of a link 13 which at its opposite end is pivotally connected to the depending arm $5^x$ of a rocker 5.

In the operation of the device, it will be understood that the load-carrying springs $10^x$ will be so proportioned to the weight of the chassis that the springs will act through the collars 11 links 13 and rockers 5 to maintain the said elements substantially in the position shown in Fig. 2 when the chassis is at rest. When the chassis is set in motion and a wheel passes over an obstruction and is elevated, its rocker pivotally moves against the resistance of the appropriate load-carrying spring $10^x$ through the movement of link 13 and sleeve and collar 11, 11×. When the force which thus swings the rocker is dissipated and the rocker is swung back into normal position by the return movement of sleeve and collar 11, 11×, the latter will be controlled against undue movement by bumper spring 10, which thus acts as a shock absorber. The provision of a sleeve of substantial bearing surface in conjunction with the collar insures movement of the latter without binding on the tubular frame member and permits a single point of connection for the inner end of link 13.

In the modification illustrated in Figs. 3 and 5 the ball and socket connection between the rocker and the frame is dispensed with, a horizontal pivot stud 14 being employed. The connection between the rocker and the axle comprises a pivot stud 15 carried by the rocker and fitted within a sleeve 16 bolted to the axle in any suitable manner. The link 17 extends within the tubular longitudinal frame member 1 and is connected with a pivot stud 18, the ends of the stud passing through slots 19 in the member 1 and thence being secured within apertures formed in the short sleeve 20 intermediate the load-carrying spring 10× and the bumper spring 10. In this construction when one wheel rises over an obstruction and that end of the axle is elevated and then lowered, the axle sleeve 16 at the opposite end will oscillate upon its pivot stud 15 of the appropriate rocker.

Having described our improvements, what we claim and desire to secure by Letters Patent is—

1. In a motor driven carriage a frame comprising longitudinal members and transverse connecting members, load-carrying springs horizontally guided upon said longitudinal members, front and rear axles, sleeves adapted to engage said springs, a series of rockers each having a ball and socket connection at one end with the frame and secured at the opposite end to an axle, and a link connecting each rocker with a sleeve.

2. In a motor driven carriage a frame comprising longitudinal members and transverse connecting members, load-carrying springs horizontally guided upon said longitudinal members, front and rear axles, a series of sleeves each guided upon a longitudinal frame member and having a contact member engaging a load-carrying spring, a series of rockers each having a ball and socket connection at one end with the frame and secured at the opposite end with an axle and a link pivotally connecting the rocker and sleeve.

3. In a motor driven carriage a frame comprising longitudinal members and transverse connecting members, load-carrying springs horizontally guided upon said longitudinal members, front and rear axles, sleeves upon said longitudinal members and adapted to engage said springs, a series of rockers each connecting an axle and the frame, and guiding devices intermediate an axle and the frame comprising a roller carried by one of said members and parallel guide plates carried by the second member to cooperate with the roller, substantially as described.

4. In a motor driven carriage, a frame comprising longitudinal members and transverse connecting members, the front transverse member projecting forwardly of the longitudinal members in U shaped formation, load carrying springs horizontally supported upon said longitudinal members, connections intermediate said axles and the load-carrying springs, opposed guide-plates carried by the front transverse frame member, and a roller carried by the axle in position to be controlled by said guide plates, substantially as described.

In testimony whereof, we have signed our names to this specification.

HENRIK N. GARSON.
THORVALD N. GARSON.